Patented Nov. 2, 1948

2,452,995

UNITED STATES PATENT OFFICE 2,452,995

SOLDERING, BRAZING, AND WELDING FLUXES

Lionel Cinamon, New York, N. Y.

No Drawing. Application September 29, 1944,
Serial No. 556,497

4 Claims. (Cl. 148—26)

This invention relates to fluxes, and more particularly to a novel and highly improved composition for soldering, brazing and welding of ferrous and non-ferrous metals and the alloys thereof.

In this art, various compositions have been used for fluxing purposes wherein fluorides are essential constituents of the flux. These fluxes are used in the form of their alkali, neutral or acid salts of hydrofluoric acid or of the complex silico-, titano-, boro-, fluoric acids, and the like. However, these fluxes have not afforded the universality of use for all metals. Even when they worked satisfactorily for a specific metal, they proved objectionable with other metals because of their discoloring effects, pitting, uneven wetting action, and the like. Furthermore, the freezing point of such compositions is higher than that regarded as desirable. It also has been noted with grave concern that these fluxing compositions have a great tendency to crystallization, and as a consequence their shelf life is shortened.

Accordingly, the objects of this invention are to provide a composition which: (a) is adapted for use as a flux in the soldering, brazing and welding of a great variety of metals and alloys; (b) does not discolor the metals and alloys; (c) has an advantageously low freezing point; (d) minimizes pitting and pinholes; (e) has an improved wetting action so as to cause the solder to flow and spread more readily; (f) may be easily washed away in the customary fashion after the operator has completed the union of the metals and alloys; and (g) has a markedly decreased tendency to crystallize.

The essence of the invention which renders the foregoing objects possible of accomplishment resides in the incorporation in a fluxing composition of the fluoride type of phosphorus compounds.

Among the phosphorus compounds discovered which produce excellent results in these compositions are the acids and various salts of phosphoric acid, pyrophosphoric acid, metaphosphoric acid, hypophosphorus acid, the acids and salts derived from $P_4O_6$, $P_2O_4$, and the like.

It is to be noted that any salt of an acid of phosphorus may be prepared from the alkali metals, ammonia and other compounds related thereto.

The following examples in which the proportions are given by weight are illustrative of the invention:

*Example I*

A flux is prepared from:

| | Grams |
|---|---|
| Water | 92.8 |
| Potassium acid fluoride | 40.0 |
| Borax | 15.2 |
| Potassium silico fluoride | 200.0 |
| Boric acid | 152.0 |

To 100 grams of the aforesaid flux there were added phosphoric acid in effective increments of from 10 to 50 grams which produced variations in the pH from approximately 5.6 to 1.7 (determined electrometrically). Among the improvements observed it was noted that the phosphorated flux decreased the pitting action on nickel.

To 100 grams of the aforesaid flux there were added $K_2HPO_4.3H_2O$ in effective increments of from 5 to 150 grams which produced variations in the pH from approximately 5.6 to 7.4. It was observed that the lower increments of the phosphorus compound produced a marked improvement in the wetting action, cleaning of the metal and soldering action on metals such as copper, brass, nickel, iron and stainless steel; and that this effectiveness remained practically unimpaired at the 150 grams increment level.

To 100 grams of the aforesaid flux there were added a mixture composed of $K_2HPO_4$ (approximately 1 part) and $KH_2PO_4$ approximately 4 parts) in effective increments of from 10 to 50 grams so that the pH of the phosphorized flux remained relatively constant. It was noted that this flux produced a marked improvement in the cleaning of nickel.

The electrometric pH determinations in the foregoing cases, as well as in all those hereinafter described, were carried out in accordance with the following procedure: 5 grams of a composition are suspended in 50 cc. of distilled water at room temperature, and the pH is ascertained by means of a Beckman electrometric pH meter.

*Example II*

A flux is prepared from:

| | Grams |
|---|---|
| Water | 120.0 |
| Potassium acid fluoride | 40.0 |
| Potassium fluoride | 141.2 |
| Potassium silico fluoride | 4.0 |
| Potassium tetraborate ($K_2B_4O_7.5H_2O$) | 8.0 |
| Boric acid | 206.8 |

To 100 grams of the aforesaid flux there were added phosphoric acid in effective increments of from 10 to 50 grams which produced variations in the pH from approximately 4.3 to 2.5. Among the improvements observed, it was noted that the phosphorized flux produced a marked increase in wetting action on stainless steel; decreased the discoloring of iron and stainless steel; and decreased the pitting of iron.

To 100 grams of the aforesaid flux there were added $K_2HPO_4.3H_2O$ in effective increments of from 5 to 200 grams which produced variations in the pH from approximately 6.8 to 7.4. It was observed that increments of from 15 to 150 grams of the phosphorus compound improved the wetting action and cleaning of the metal in the case of the ferrous metals. Higher increments improved the wetting action on copper and the ferrous metals.

Example III

A flux is prepared from:

| | Grams |
|---|---|
| Water | 104.5 |
| Potassium carbonate | 6.65 |
| Potassium acid fluoride | 38.5 |
| Potassium fluoride | 136.0 |
| Potassium silico fluoride | 3.85 |
| Boric acid | 210 |

To 100 grams of the aforesaid flux there were added phosphoric acid in effective increments of from 10 to 50 grams which produced variations in the pH from approximately 6.0 to 2.7. Among the improvements observed, it was noted that the phosphorized flux having lower increments of the phosphoric acid showed a marked increase in wetting action on the ferrous metals; improved cleaning of copper, brass, nickel and iron.

To 100 grams of the aforesaid flux there were added K₂HPO₄.3H₂O in effective increments of from 5 to 150 grams which produced variations in the pH from approximately 6.8 to 7.3. It was observed that these phosphorized fluxes produced marked improvements in wetting action on copper, brass, nickel and stainless steel; and decreased the pitting action on these metals as well as iron.

Example IV

A flux is prepared from:

| | Grams |
|---|---|
| Water | 120 |
| Potassium acid fluoride | 234 |
| Boric acid | 93 |

To 100 grams of the aforesaid flux there were added phosphoric acid in effective increments of from 10 to 50 grams which produced variations in the pH from approximately 5.5 to 2.6. Among the improvements observed, it was noted that the phosphorized flux produced a marked improvement in the cleaning of copper and stainless steel.

To 100 grams of the aforesaid flux there were added K₂HPO₄.3H₂O in effective increments of from 5 to 150 grams which produced variations in the pH from approximately 5.5 to 6.7. It was observed that the higher increments of phosphorus compound increased the wetting action on copper, brass and nickel; the intermediate increments decreased the pitting of copper, brass, nickel and stainless steel.

To 100 grams of the aforesaid flux there were added a mixture composed of K₂HPO₄ (approximately 1 part) and KH₂PO₄ (approximately 9 parts) in effective increments of 12 to 60 grams so that the pH of the phosphorized flux remained relatively constant. It was noted that these fluxes produced a marked improvement in the cleaning of nickel and iron.

Example V

A flux is prepared from:

| | Grams |
|---|---|
| Water | 100 |
| Potassium carbonate | 6.5 |
| Potassium acid fluoride | 38.5 |
| Potassium fluoride | 136 |
| Potassium borofluoride (KBF₄) | 23.15 |
| Potassium silico fluoride | 3.85 |
| Boric acid | 192 |

To 100 grams of the aforesaid flux there were added K₂HPO₄.3H₂O in effective increments of from 5 to 150 grams which produced variations in the pH from approximately 6.9 to 7.4. It was observed that these phosphorated fluxes produced improved wetting action on metals such as copper, brass, nickel, iron and stainless steel; improved cleaning of iron and stainless steel; and decreased pitting of copper.

Example VI

A flux is prepared from:

| | Grams |
|---|---|
| Water | 120 |
| Potassium carbonate | 80 |
| Potassium acid fluoride | 240 |
| Boric acid | 80 |

To 100 grams of the aforesaid flux there were added phosphoric acid in effective increments of from 10 to 50 grams which produced variations in the pH from approximately 6.2 to 4.9. Among the improvements observed, it was noted that the phosphorized flux produced a marked improvement in wetting action on nickel and stainless steel; an improvement in cleaning action on copper and stainless steel.

To 100 grams of the aforesaid flux there were added K₂HPO₄.3H₂O in effective increments of from 5 to 150 grams which produced variations in the pH from approximately 6.1 to 6.5. It was observed that the higher increments of the phosphorus compound produced a marked improvement in the wetting action of the fluxes on copper, brass, nickel and stainless steel.

Example VII

A flux is prepared from:

| | Grams |
|---|---|
| Water | 120 |
| Potassium carbonate | 80 |
| Potassium acid fluoride | 200 |
| Boric acid | 120 |

To 100 grams of the aforesaid flux there were added phosphoric acid in effective increments of from 10 to 50 grams which produced variations in the pH from approximately 6.1 to 3.8. Among the improvements observed, it was noted that the phosphorized fluxes showed improved wetting action on copper and iron; improved cleaning of nickel and iron; and decreased pitting of copper and iron.

To 100 grams of the aforesaid flux there were added K₂HPO₄.3H₂O in effective increments of from 5 to 150 grams which produced variations in the pH from approximately 6.3 to 6.6. It was observed that these phosphorus fluxes showed marked improvements in wetting action on copper and nickel; improved cleaning of nickel; and decreased pitting of copper.

Example VIII

A flux is prepared from:

| | Grams |
|---|---|
| Water | 120 |
| Potassium carbonate | 68 |
| Potassium acid fluoride | 200 |
| Boric acid | 132 |

To 100 grams of the aforesaid flux there were added phosphoric acid in effective increments of from 10 to 50 grams which produced variations in the pH from approximately 5.9 to 4.2. Among the improvements observed, it was noted that the phosphorized flux showed an improvement in the cleaning action on brass and nickel.

To 100 grams of the aforesaid flux there were added K₂HPO₄.3H₂O in effective increments of from 5 to 200 grams which produced variations in the pH from approximately 6.4 to 6.8. It was observed that these fluxes show marked improvements in wetting action on nickel; improved cleaning of iron; and decreased pitting of iron.

*Example IX*

A flux is prepared from:

| | Grams |
|---|---|
| Water | 120 |
| Sodium fluoride | 18 |
| Potassium tetraborate ($K_2B_4O_7 \cdot 5H_2O$) | 18 |
| Boric acid | 264 |

To 100 grams of the aforesaid flux there were added $K_2HPO_4 \cdot 3H_2O$ in effective increments of from 5 to 150 grams which produced variations in the pH from approximately 6.2 to 7.7. It was observed that these fluxes showed a marked improvement in wetting action on metals such as copper, brass, nickel, iron and stainless steel; improved cleaning action on iron; and decreased pitting of stainless steel.

*Example X*

A flux is prepared from:

| | Grams |
|---|---|
| Water | 90 |
| Borax | 25 |
| Sodium acid fluoride | 10 |
| Boric acid | 375 |

To 100 grams of the aforesaid flux there were added phosphoric acid in effective increments of from 10 to 50 grams which produced variations in the pH from approximately 2.0 to 1.5. Among the improvements observed, it was noted that the phosphorized flux decreased the pitting action on brass.

To 100 grams of the aforesaid flux there were added $K_2HPO_4 \cdot 3H_2O$ in effective increments of from 5 to 150 grams which produced variations in the pH from approximately 5.8 to 7.4. It was observed that these fluxes showed a marked improvement in wetting action on copper, brass, nickel, iron and stainless steel, and decreased pitting of brass and iron.

To 100 grams of the aforesaid flux there were added a mixture composed of $K_2HPO_4$ (approximately 1 part) and $KH_2PO_4$ (approximately 5 parts) in effective increments of from 12 to 64 grams so that the pH of the phosphorized flux remained relatively constant. It was noted that this flux produced a marked improvement in the wetting action on copper.

*Example XI*

A flux is prepared from:

| | Grams |
|---|---|
| Water | 100 |
| Potassium tetraborate ($K_2B_4O_7 \cdot 5H_2O$) | 160 |
| Potassium acid fluoride | 20 |
| Boric acid | 160 |

To 100 grams of the aforesaid flux there were added phosphoric acid in effective increments of from 11 to 56 grams which produced variations in the pH from approximately 4.9 to 1.7. Among the improvements observed, it was noted that the phosphorized flux showed a marked improvement in wetting action and cleaning of the metal in the case of copper.

To 100 grams of the aforesaid flux there were added $K_2HPO_4 \cdot 3H_2O$ in effective increments of from 5 to 200 grams which produced variations in the pH from approximately 6.3 to 8.3. It was observed that these phosphorized fluxes produced a marked improvement in wetting action on metals such as copper, brass, nickel, iron and stainless steel; a marked improvement in cleaning action on copper; and decreased pitting of brass, iron and stainless steel.

To 100 grams of the aforesaid flux there were added a mixture composed of $K_2HPO_4$ (approximately 4 parts) and $KH_2PO_4$ (approximately 1 part) in effective increments of 15 to 80 grams so that the pH of the phosphorized flux remained relatively constant. It was noted that these fluxes showed a marked improvement in the cleaning of brass.

*Example XII*

A flux is prepared from:

| | Grams |
|---|---|
| Water | 96 |
| Potassium hydroxide | 156 |
| Potassium acid fluoride | 380 |
| Boric acid | 690 |
| Potassium silico fluoride | 0.375 |

To 100 grams of the aforesaid flux there were added $K_2HPO_4 \cdot 3H_2O$ in effective increments of from 20 to 100 grams which produced variations in the pH from approximately 6.6 to 6.8. Among the improvements observed, it was noted that these fluxes showed a marked increase in wetting action on copper, nickel and iron; and increased cleaning action on nickel.

To 100 grams of the aforesaid flux there were added a mixture composed of $K_2HPO_4$ (approximately 1.3 parts) and $KH_2PO_4$ (approximately 1 part) in effective increments of 14 to 70 grams so that the pH of the phosphorized flux remained relatively constant. It was noted that these fluxes, in the higher increments of the phosphorus containing mixtures, showed an improved cleaning action on nickel.

It is to be understood that the foregoing examples are merely illustrative of the fluxes which may be improved so advantageously by the incorporation therewith of various phosphorus compounds. It is further to be understood that the phosphorus compounds include phosphides, phosphonium compounds and other phosphorus containing materials of organic and/or inorganic structure. All the phosphorus compounds may be used either singly or in various combinations with each other for incorporating phosphorus into the fluxes to produce the improved compositions of this invention.

I claim:

1. In a flux embodying boric acid and an alkali fluorine compound the improvement which comprises: the combination with said flux of a member of the group consisting of an acid of pentavalent phosphorus and the alkali metal salts thereof.

2. In a flux embodying boric acid and an alkali fluorine compound the improvement which comprises: the combination with said flux of a member of the group consisting of an acid of pentavalent phosphorus and the alkali metal salts thereof which imparts a phosphorus content to the flux of approximately 0.65% to 9.2%.

3. In a flux embodying boric acid and an alkali fluorine compound the improvement which comprises: the combination with said flux of an alkali metal salt of an acid of pentavalent phosphorus.

4. In a flux embodying boric acid and an alkali fluorine compound the improvement which comprises the combination with said flux of an alkali metal salt of an acid of pentavalent phosphorus which imparts a phosphorus content to the flux of approximately 0.65% to 9.2%.

LIONEL CINAMON

REFERENCES CITED

The following references are of record in the file of this patent:

UNITED STATES PATENTS

| Number | Name | Date |
|---|---|---|
| 2,171,041 | Michel | Aug. 29, 1939 |
| 2,174,551 | Cinamon et al. | Oct. 3, 1939 |
| 2,284,619 | Epstein | June 2, 1942 |

FOREIGN PATENTS

| Number | Country | Date |
|---|---|---|
| 108,778 | Great Britain | Aug. 23, 1917 |
| 313,931 | Germany | July 25, 1919 |